US009530237B2

(12) United States Patent
Burns et al.

(10) Patent No.: US 9,530,237 B2
(45) Date of Patent: Dec. 27, 2016

(54) INTERPOLATION CIRCUITRY AND TECHNIQUES FOR GRAPHICS PROCESSING

(71) Applicant: Apple Inc., Cupertino, CA (US)

(72) Inventors: Christopher A. Burns, Austin, TX (US); Andrew Pomianowski, Sunnyvale, CA (US); Anthony P. DeLaurier, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/677,280

(22) Filed: Apr. 2, 2015

(65) Prior Publication Data

US 2016/0292907 A1    Oct. 6, 2016

(51) Int. Cl.
| | | |
|---|---|---|
| G06T 11/40 | (2006.01) | |
| G06T 11/00 | (2006.01) | |
| G06T 3/40 | (2006.01) | |
| G06T 15/04 | (2011.01) | |
| G06T 15/80 | (2011.01) | |

(52) U.S. Cl.
CPC ............ *G06T 15/04* (2013.01); *G06T 11/001* (2013.01); *G06T 11/40* (2013.01); *G06T 15/80* (2013.01); *G06T 2200/04* (2013.01); *G06T 2200/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,812,141 A | * | 9/1998 | Kamen | G06F 15/10 345/441 |
| 6,166,748 A | * | 12/2000 | Van Hook | A63F 13/00 345/522 |
| 6,549,210 B1 | * | 4/2003 | Van Hook | G06F 12/0875 345/557 |
| 6,563,925 B1 | * | 5/2003 | Krasny | H04M 9/082 370/289 |

(Continued)

OTHER PUBLICATIONS

Martin Kraus and Thomas Ertl, "Adaptive Texture Maps," The Eurographics Association, Graphics Hardware (2002), pp. 7-15, 153.

(Continued)

*Primary Examiner* — Wesner Sajous
(74) *Attorney, Agent, or Firm* — Meyertons, Hood, Kivlin, Kowert & Goetzel, P.C.

(57) ABSTRACT

Techniques are disclosed relating to interpolation for texture mapping. In some embodiments, a graphics unit includes circuitry configured to map a texture to a screen space such that a set of multiple in the screen space falls between first and second adjacent texels of the texture in a first dimension. In some embodiments, the graphics unit also includes texture processing circuitry configured to perform different types of interpolation for pixels in the group of pixels. In these embodiments, this includes determining pixel attributes for first and second end groups of pixels in the set of pixels using a nearest-neighbor interpolation technique and attributes of the first and second texels respectively. In these embodiments, this also includes determining pixel attributes for an intermediate group of pixels in the set of pixels using a second, different interpolation technique and attributes of both the first and second texels.

18 Claims, 10 Drawing Sheets

(56) References Cited

U.S. PATENT DOCUMENTS

| | | | |
|---|---|---|---|
| 6,597,363 B1* | 7/2003 | Duluk, Jr. | G06T 15/005 345/506 |
| 6,937,250 B1* | 8/2005 | Schilling | G06T 15/04 345/582 |
| 7,477,360 B2* | 1/2009 | England | G06T 11/60 356/4.01 |
| 7,643,676 B2 | 1/2010 | Malvar | |
| 2004/0125103 A1* | 7/2004 | Kaufman | G06T 15/005 345/419 |
| 2007/0002068 A1* | 1/2007 | Whitted | G06T 15/005 345/582 |
| 2014/0085507 A1 | 3/2014 | Pillman et al. | |

OTHER PUBLICATIONS

Stefan Horbelt, et al., "Texture Mapping by Successive Refinement," International Conference on Image Processing, vol. 2, Sep. 10-13, 2000, pp. 307-310.

Manual texture filtering for pixelated games in WebGL, WordPress.com, Jan. 25, 2014, https://csantosbh.wordpress.com/2014/01/25/manual-texture-filtering-for-pixelated-games-in-webgl/, 7 pages. [Retrieved Jan. 20, 2015].

* cited by examiner

INTERPOLATION CIRCUITRY AND TECHNIQUES FOR GRAPHICS PROCESSING

BACKGROUND

Technical Field

This disclosure relates generally to graphics processing and more specifically to texture mapping.

Description of the Related Art

Texture mapping is a well-known graphics processing technique in which a texture (e.g., an image) is applied to the surface of an object to be displayed. Textures may indicate color and transparency of pixels corresponding to object surfaces, for example.

Many graphics applications use non-photorealistic rendering techniques. For example, to achieve a specific visual look certain applications such as video games may deliberately magnify and render using nearest-neighbor sampling (which may also be referred to as proximal interpolation or point-sampling). This may result in a pixelated effect in which a block of pixels surrounding each texel share the same attributes. For example, one application or video game which uses a similar technique is the popular game MINECRAFT®. Traditional nearest-neighbor sampling techniques, however, may result in undesirable visual artifacts (often referred to as aliasing) at boundaries between texels, e.g., because of the discontinuous rendering of the nearest-neighbor function.

SUMMARY

Techniques are disclosed relating to interpolation for graphics processing. In some embodiments, a graphics unit includes circuitry configured to map a texture to a screen space such that a set of multiple pixels in the screen space falls between first and second adjacent texels of the texture in a first dimension. The graphics unit may be configured to perform the mapping in response to instructions in a graphics program, for example. In some embodiments, the graphics unit also includes texture processing circuitry configured to perform different types of interpolation for pixels in the group of pixels. In these embodiments, this includes using a nearest-neighbor interpolation technique and attributes of the first and second texels respectively to determine pixel attributes for first and second end groups of pixels in the set of pixels. In these embodiments, this also includes using a second, different interpolation technique and attributes of both the first and second texels to determine pixel attributes for an intermediate group of pixels in the set of pixels. In some embodiments, these adaptive processing techniques may produce a desired visual effect without visual artifacts of traditional nearest-neighbor interpolation.

In some embodiments, a method includes receiving, by a graphics unit that includes texture processing circuitry, a parameter from a graphics program. In some embodiments, the method also includes mapping a texture to a screen space such that a set of multiple pixels in the screen space falls between first and second adjacent texels of the texture in a first dimension. In some embodiments, the method further includes, based on receiving the parameter: determining pixel attributes for first and second end groups of pixels in the set of pixels using a nearest-neighbor interpolation technique and attributes of the first and second texels respectively and determining pixel attributes for an intermediate group of pixels in the set of pixels using a second, different interpolation technique and attributes of both the first and second texels.

In some embodiments, a non-transitory computer-readable medium stores program instructions that are executable by a computing device to perform operations that include: determining an adaptive interpolation parameter, mapping a texture to a screen space such that a set of multiple pixels in the screen space falls between first and second adjacent texels of the texture in a first dimension, determining, based on the adaptive interpolation parameter, pixel attributes for first and second end groups of pixels in the set of pixels using a nearest-neighbor interpolation technique and attributes of the first and second texels respectively, and determining, based on the adaptive interpolation parameter, pixel attributes for an intermediate group of pixels in the set of pixels using a second, different interpolation technique and attributes of both the first and second texels.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1A:
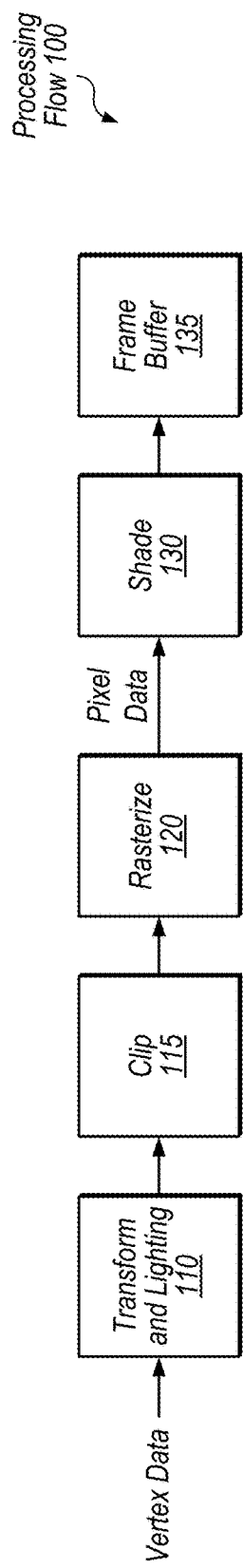
FIG. 1A is a block diagram illustrating an exemplary processor that includes a register file and caching circuitry for the register file.
Figure 1B:
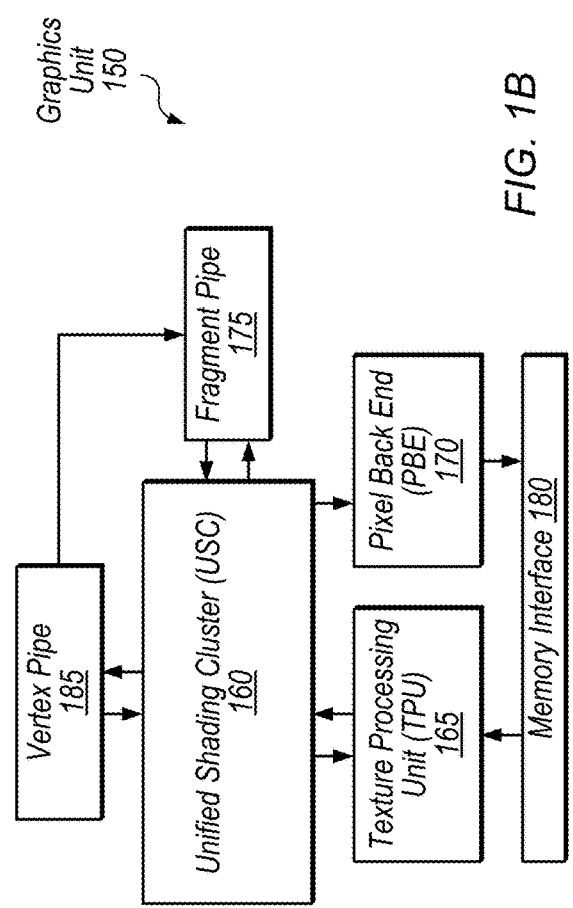
FIG. 1B is a block diagram illustrating one embodiment of a processor pipeline.

This disclosure initially describes, with reference to FIGS. 1A-1B, an overview of a graphics processing flow and an exemplary graphics unit. Embodiments of adaptive interpolation techniques are described with reference to FIGS. 2-5. Embodiments of texel smoothing group techniques are described with reference to FIG. 6. Exemplary methods and an exemplary device are described with reference to FIGS. 7-8. In some embodiments, the disclosed techniques may reduce aliasing at boundaries between texels in a magnified texture while producing a desired visual effect.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 that includes a texture state cache is shown. In the illustrated embodiment, graphics unit 150 includes unified shading cluster (USC) 160, vertex pipe 185, fragment pipe 175, texture processing unit (TPU) 165, pixel back end (PBE) 170, memory interface 180, and texture state cache 190. In one embodiment, graphics unit 150 may be configured to process both vertex and fragment data using USC 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with USC 160 in order to coordinate vertex processing. In the illustrated embodiment, vertex pipe 185 is configured to send processed data to fragment pipe 175 and/or USC 160 for further processing.

Fragment pipe 175, in the illustrated embodiment, may include various fixed-function hardware configured to process pixel data. Fragment pipe 175 may be configured to communicate with USC 160 in order to coordinate fragment processing. Fragment pipe 175 may be configured to perform rasterization on polygons from vertex pipe 185 and/or USC 160 to generate fragment data. Vertex pipe 185 and/or fragment pipe 175 may be coupled to memory interface 180 (coupling not shown) in order to access graphics data.

USC 160, in the illustrated embodiment, is configured to receive vertex data from vertex pipe 185 and fragment data from fragment pipe 175 and/or TPU 165. USC 160 may be configured to perform vertex processing tasks on vertex data which may include various transformations and/or adjustments of vertex data. USC 160, in the illustrated embodiment, is also configured to perform fragment processing tasks on pixel data such as texturing and shading, for example. USC 160 may include multiple execution instances for processing data in parallel. USC 160 may be referred to as "unified" in the illustrated embodiment in the sense that it is configured to process both vertex and fragment data. In other embodiments, programmable shaders may be configured to process only vertex data or only fragment data.

TPU 165, in the illustrated embodiment, is configured to schedule fragment processing tasks from USC 160. In one embodiment, TPU 165 may be configured to pre-fetch texture data and assign initial colors to fragments for further processing by USC 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in USC 160.

PBE 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as USC 160 may be coupled in any of various appropriate configurations to other programmable and/or fixed-function elements in a graphics unit. The exemplary embodiment of FIG. 1B shows one possible configuration of a graphics unit 150 for illustrative purposes.

Adaptive Interpolation

In various embodiments, for a set of pixels between two texels in a given dimension, TPU 165 is configured to use adaptive interpolation that utilizes at least two different interpolation techniques for different groups of pixels in the set. In some embodiments, one of the techniques is nearest-neighbor, while the other technique is a non-nearest-neighbor technique (e.g., bilinear interpolation).

As used herein, the term "adaptive interpolation" refers to use of multiple interpolation techniques, where one of the techniques is nearest-neighbor interpolation, to determine attributes for pixels in a group of pixels that fall between neighboring texels in a screen space. As used herein, the term "nearest-neighbor" in the context of texture sampling refers to an interpolation technique in which the value of a pixel attribute is determined based on an attribute of single texel that is the nearest texel to the pixel, in a mapping of a texture that includes the texel to a space that includes the pixel. The term "non-nearest-neighbor" refers to all other interpolation techniques.

Figure 2:
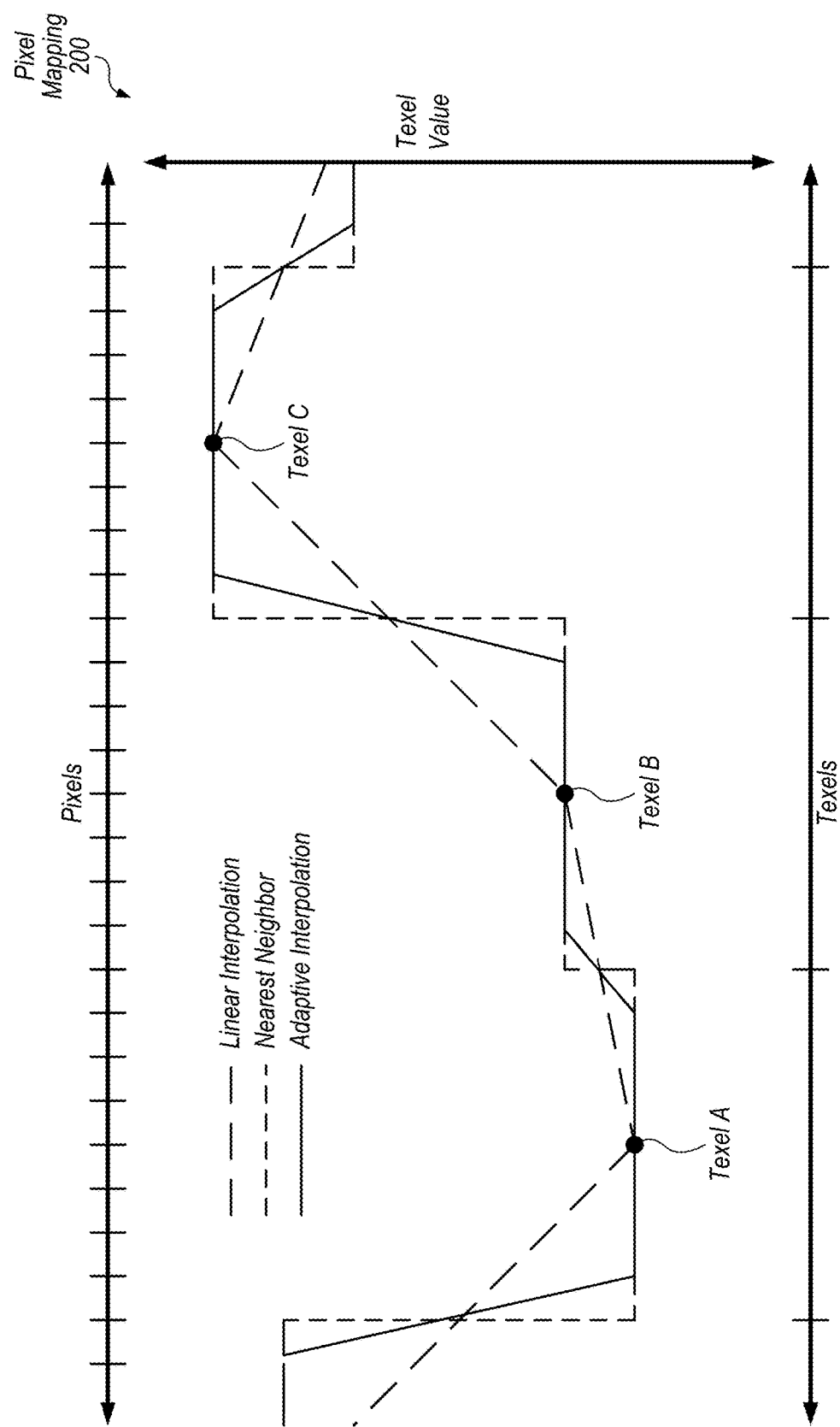
FIG. 2 is a diagram illustrating an exemplary adaptive interpolation technique in one dimension of a screen space, according to some embodiments.

FIG. 2 is a diagram that illustrates exemplary adaptive interpolation in one dimension of a screen space according to some embodiments. In the illustrated example, the positions of three texels A, B, and C are shown relative to screen space pixels in a mapping of a texture to the illustrated dimension of the screen space. In the illustrated example, USC 160 has magnified the texture (e.g., based on instructions from a graphics program) such that there are multiple pixels between each texel in screen space (8 pixels between each texel in the illustrated embodiment, in the horizontal dimension). The displayed vertical "texel value" dimension may represent one or more of various attributes or channels, such as an R, G, or B value for a pixel, or non-color information such as transparency, for example.

The dashed line with shorter dashes, in the illustrated embodiment, corresponds to pixel values assigned using a nearest-neighbor technique. In this technique, TPU 165 assigns a value to a given pixel attribute based on the value of the attribute for the nearest texel. This may generally result in a desired visual effect, but may cause aliasing between texels. For example, FIG. 3A element (a), discussed in further detail below, demonstrates this aliasing in the visual artifacts (jagged lines) between the blocks of different shades. This aliasing may result from rotation and magnification of the texture relative to the screen space.

The dashed line with longer dashes, in the illustrated embodiment, corresponds to pixel values assigned using a linear interpolation technique. In this technique, TPU 165 assigns a value to a given pixel attribute based on the values of the attribute for both neighboring texels in the horizontal dimension, weighted based on the distance to each texel. This technique results in an overly smoothed image if a pixelated visual effect is desired, e.g., as shown in FIG. 3B element (d), discussed in further detail below.

The solid line, in the illustrated embodiment, corresponds to pixel values assigned using an adaptive interpolation technique. In the illustrated embodiment, TPU 165 determines values for the three pixels nearest each texel using the nearest-neighbor technique, but determines values for one or more intermediate pixels in between the texels using a linear interpolation technique. The pixel(s) nearer to each texel for which nearest-neighbor interpolation is performed may be referred to herein as an "end group" of one or more pixels while the intermediate pixel(s) for which non-nearest-neighbor interpolation is performed may be referred to as an "intermediate group" of one or more pixels. In some embodiments of adaptive interpolation, this reduces aliasing while still maintaining a desired visual effect. Increasing the interpolation width corresponding to the number of intermediate pixels may increase blurring between blocks of a rendered image.

In embodiments in which TPU 165 is configured to use a standard fractional bilinear weight for interpolation, it may be configured to use a different weight for adaptive interpolation with an interpolant value determined using equation (1):

$$\text{interpolant} = \text{clamp}\left(\frac{x - 0.5}{\text{clamp}(P * \text{linearLOD})} + 0.5\right) \quad (1)$$

where the "clamp" function restricts a value to the range [0.0, 1.0] (e.g., the value 1.2 would be clamped to 1.0 while the value 0.5 would remain 0.5), "x" is the standard weight, "linearLOD" is a level of detail value, and "P" is an interpolation width (in this case the number of pixels across which non-nearest-neighbor interpolation is performed). As used herein, the term "interpolation width" in the context of adaptive interpolation refers to an indication of the amount of pixels between adjacent texels for which the non-nearest-neighbor interpolation technique is used. Thus, the parameter P in equation 1 is one example of a parameter that specifies interpolation width.

Level of detail is a well-known graphics parameter that may indicate how many texels per pixel are present in the texture at the desired magnification. In the illustrated example, the linearLOD parameter is ⅛ (one texel per eight pixels in the relevant dimension).

In some embodiments, the interpolation width P is configurable, e.g., using instructions of a graphics program. Graphics programs typically include texture state information that may be used in accessing and applying a texture. The texture state may include base address in memory, size, clamping parameters, filtering parameters, etc. In some embodiments, the texture state includes a field usable to specify interpolation width, which may be a default value or may be configured by a given graphics program. In some embodiments, a graphics program may specify interpolation width on a per-sample basis (e.g., using a field in a sample instruction), in addition to and/or in place of specifying interpolation width using the texture state. In some embodiments in which both methods are used to specify interpolation width, a per-sample interpolation width value may override a value specified by the texture state (which may be considered a default value for the texture, for example). Thus, in various embodiments, an instruction set architecture for graphics unit 150 includes one or more constructs that allow a user to specify whether adaptive interpolation is to be performed by TPU 165 and/or the interpolation width of the adaptive interpolation.

In yet other embodiments, interpolation width(s) may be specified by the texture itself, e.g., using an alpha channel. In these embodiments, TPU 165 is configured to sample the texture to determine an interpolation width for a given sample or set of samples and then use the interpolation width to perform adaptive interpolation.

In some embodiments, execution of a graphics program may determine an interpolation width parameter by accessing a parameter included in an instruction or located at some specified location. In some embodiments, execution of a graphics program may include dynamically determining an interpolation width parameter (e.g., based on a determined level of detail).

In some embodiments, the disclosed techniques (e.g., adaptive interpolation) are performed two or more times, each time for different levels of detail of a texture. The results for the different levels of detail may be blended together (e.g., using various interpolation methods). This may facilitate trilinear filtering using mipmaps, anisotropic filtering, etc. Said another way, in some embodiments, various additional processing may be performed on the results of a series of adaptive interpolation results for different levels of detail and/or for different coordinates within the same level of detail.

In some embodiments, graphics unit 150 is configured to receive channel mask information that specifies use of adaptive interpolation for one channel or pixel attribute but not others. In embodiments in which the interpolation width is specified in texture state and/or individual sample commands, the channel information may be specified along with the interpolation width. This may allow, for example, selective sharpening of an alpha channel for punch-through transparency (in conjunction with alpha-to-coverage multi sampling) when the alpha channel is specified. It also may be useful, in non-RGB color spaces or non-color data, for example, to blur some channels and not others.

Various adaptive interpolation techniques disclosed herein may be implemented using a computer program, e.g., that includes program instructions to implement equation (1). In other embodiments, graphics unit 150 includes circuitry (e.g., in USC 160 and/or TPU 165) configured to perform the disclosed adaptive interpolation techniques in response to a parameter in a graphics program that indicates whether the circuitry should perform adaptive interpolation. In some embodiments, the circuitry is also configured to perform the adaptive interpolation based on one or more additional parameters specified by a graphics program (e.g., channel mask, interpolation width, etc.). This specialized circuitry may increase performance of graphics unit 150 in performing adaptive interpolation, relative to software implementations and may simplify the use and configuration of adaptive interpolation for programmers.

Exemplary Renderings Using Different Interpolation Widths

Figure 3A:
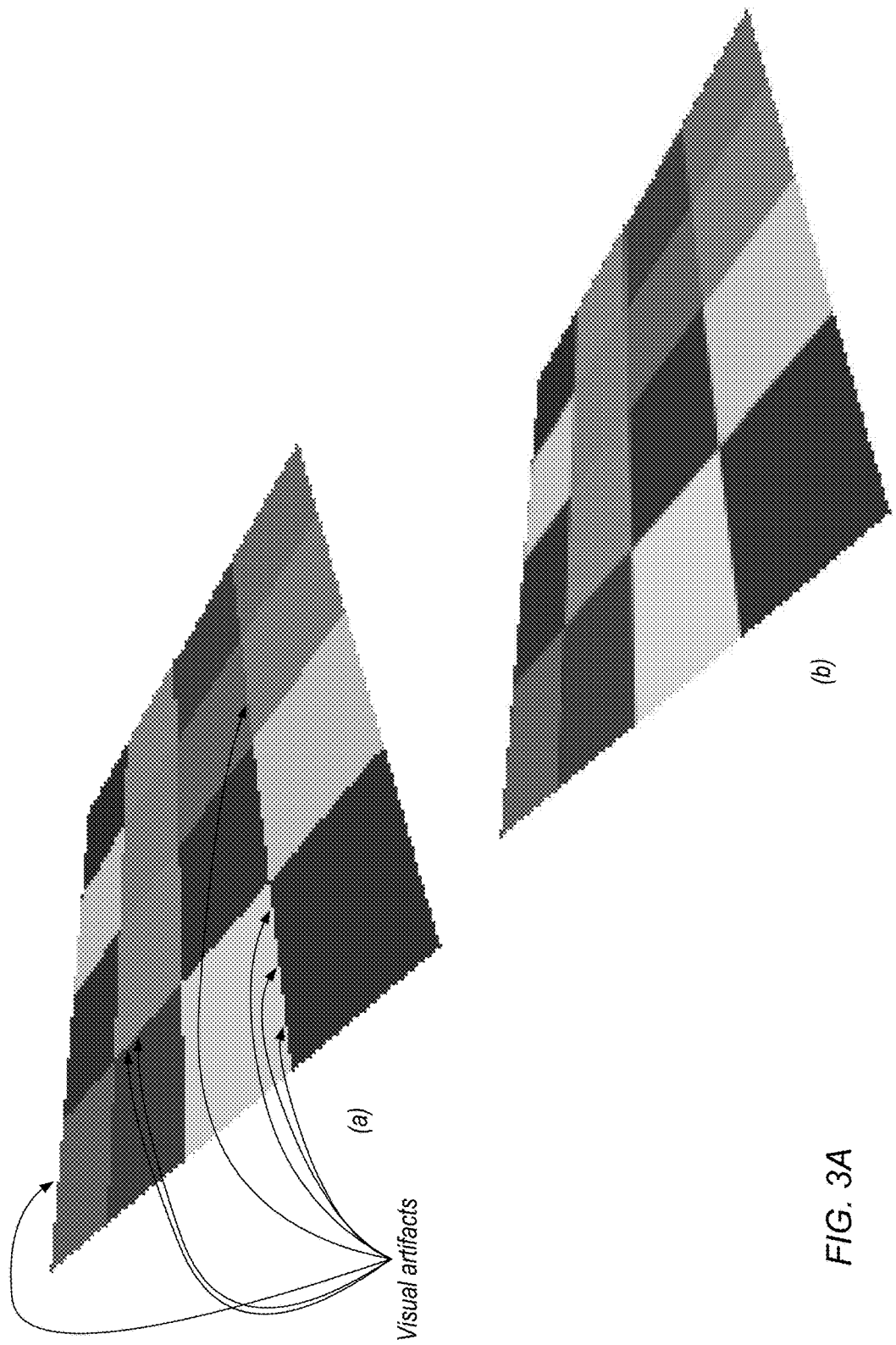
FIGS. 3A-3B illustrate exemplary results of different adaptive interpolation widths, according to some embodiments.
Figure 3B:
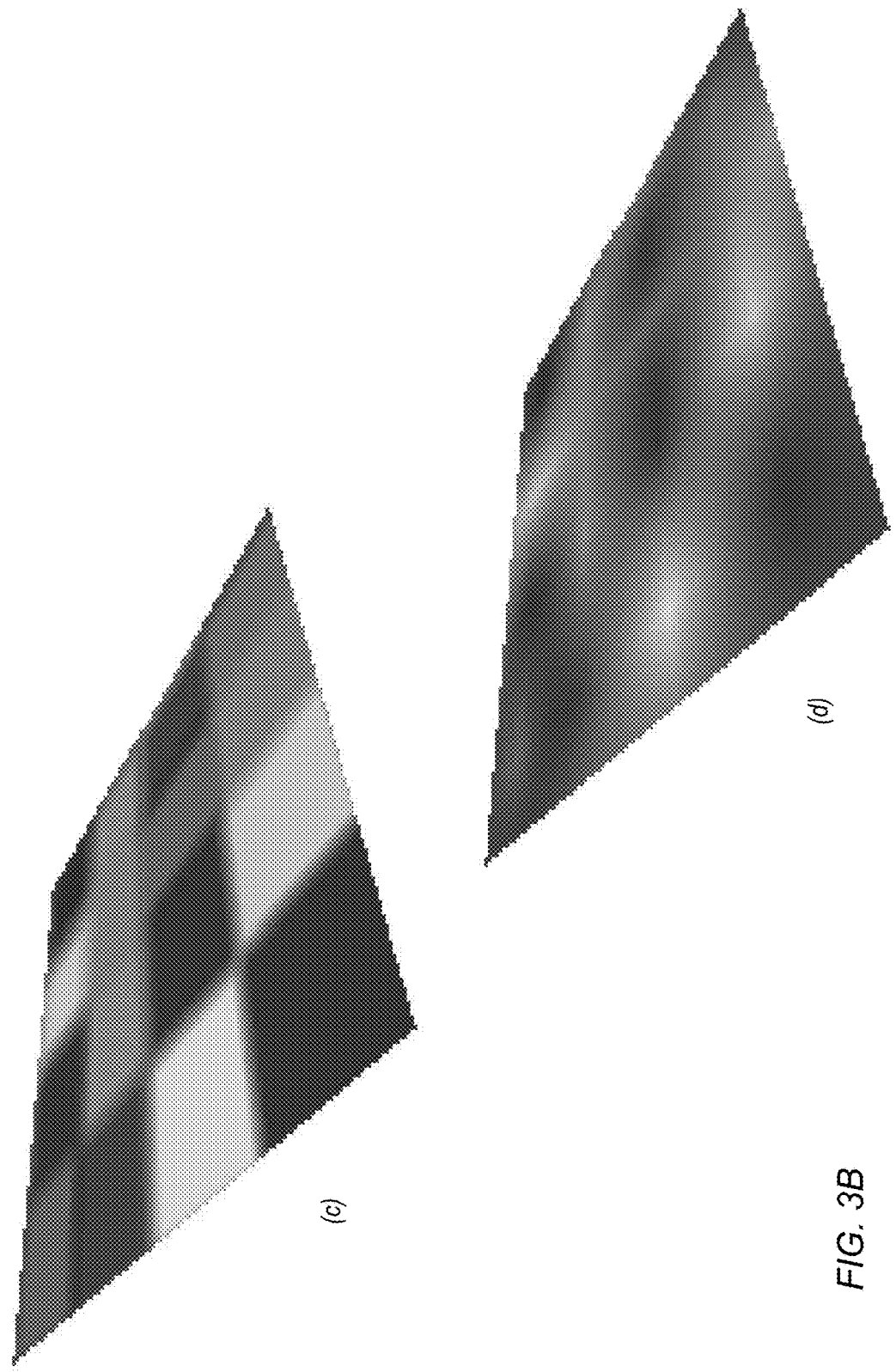
Figure 4:
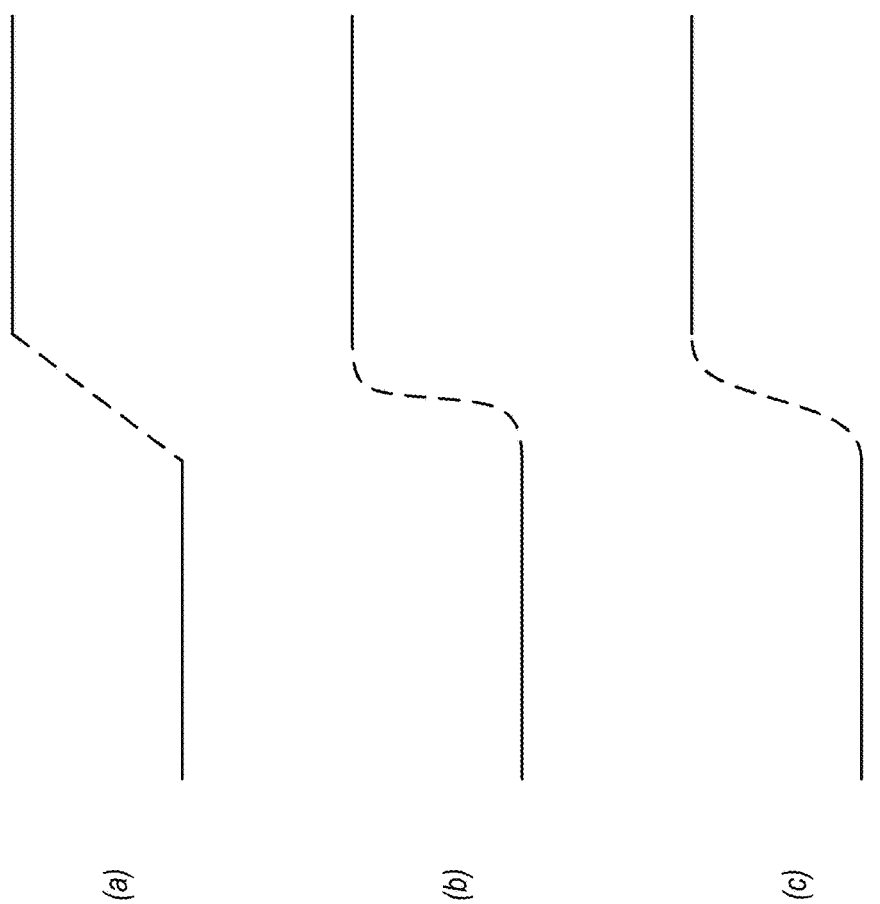
FIG. 4 is a diagram illustrating exemplary non-nearest-neighbor interpolation functions.

FIGS. 3A-3B show different renderings (elements (a)-(d)) using different interpolation width values.

In element (a), TPU 165 uses nearest-neighbor interpolation for every pixel (which corresponds to an interpolation width of 0). As shown, this results in aliasing. In the illustrated example, visual artifacts have occurred when using conventional nearest-neighbor interpolation for a rotated and magnified texture.

In element (b), the interpolation width is 1 and TPU 165 uses non-nearest-neighbor interpolation for a region corresponding to a single pixel between adjacent texels. As shown, this eliminates the aliasing effects of FIG. 3A element (a) while preserving the visual effect of a conventional nearest-neighbor interpolation. In element (c), the interpolation width is 5 such that TPU 165 uses non-nearest interpolation for a larger region (corresponding to five pixels in this embodiment) between adjacent texels. Elements (b) and (c) show that different interpolation widths may provide different amounts of blending between texels in adaptive interpolation.

In element (d), TPU uses non-nearest-neighbor interpolation (bilinear, in the illustrated embodiment) for every pixel (which may correspond to a maximum programmable value of interpolation width, or more generally to any interpolation width that exceeds the magnification factor for a rendered texture). As shown, this technique results in substantial smoothing, which does not achieve the pixelated visual effect desired for some applications.

Exemplary Non-Nearest-Neighbor Functions

The example of FIG. 2 illustrates, via the solid line labeled "Adaptive Interpolation", the effect of Equation 1 in the case where P=1, according to some embodiments. TPU 165 may, in various embodiments, utilize other non-nearest-neighbor functions, e.g., by replacing the expression 'x' in Equation 1 with more complex expressions resulting in different transition effects. For example, FIG. 4 elements (b) and (c) show that the use of a cubic polynomial function may result in a smoother transition between the nearest-neighbor region and the non-nearest-neighbor region for a given adaptive interpolation function.

Exemplary Adaptive Interpolation in Multiple Dimensions

Figure 5:
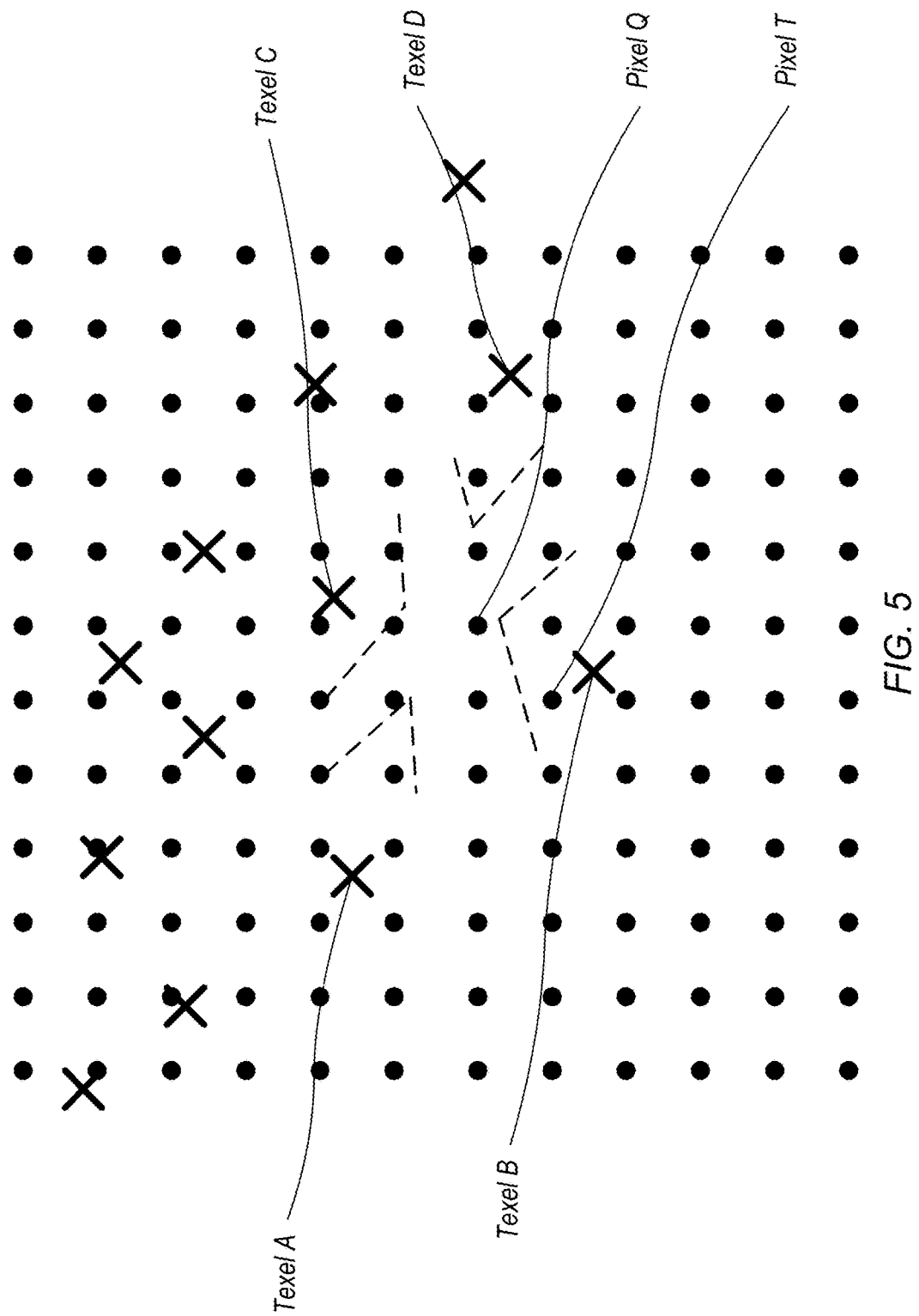
FIG. 5 is a diagram illustrating exemplary texels corresponding to the diagram of FIG. 3A element (a) relative to pixels in a screen space.

Various examples herein (such as FIG. 2) are shown using a single dimension, but TPU 165 is configured to perform adaptive interpolation in multiple dimensions, in some embodiments. The extension of adaptive interpolation to multiple dimensions follows naturally as in the case of conventional linear interpolation (e.g. bilinear, trilinear, etc.), and is not limited to 1, 2, or even 3 dimensions. As an illustration of the two-dimensional case, FIG. 5 shows an exemplary set of texels used to render the FIG. 3 element (a) relative to a plurality of pixels in a screen space. The dashed lines in FIG. 5 outline an exemplary area that falls within the interpolation width (e.g., based on parameter P) according to some embodiments of an adaptive interpolation technique.

In some embodiments, adaptive interpolation utilizes a single piece-wise interpolation function that that degenerates to nearest-neighbor interpolation in some places (e.g., for end groups of pixels) and non-nearest-neighbor interpolation in other places (e.g., for an intermediate group of pixels such as those falling between the dashed lines in FIG. 5). Thus, in the illustrated embodiment, TPU 165 may implement an adaptive interpolation function that results in using a nearest-neighbor approach for pixel T and using a non-nearest-neighbor approach (e.g., bilinear) for pixel Q. This may result in the visual effect shown for FIG. 3B element (c), for example.

Texel Smoothing Groups

In some situations, it may be desirable to use adaptive interpolation for some borders between texels and not for others, and/or to use different interpolation widths for different borders. For example, a pixelated effect may be desired for portions of an object being rendered while a smoother effect is desired for others. TPU 165, in some embodiments, is configured to perform different interpolation techniques for different texel smoothing groups, to achieve this desired visual effect.

Figure 6:
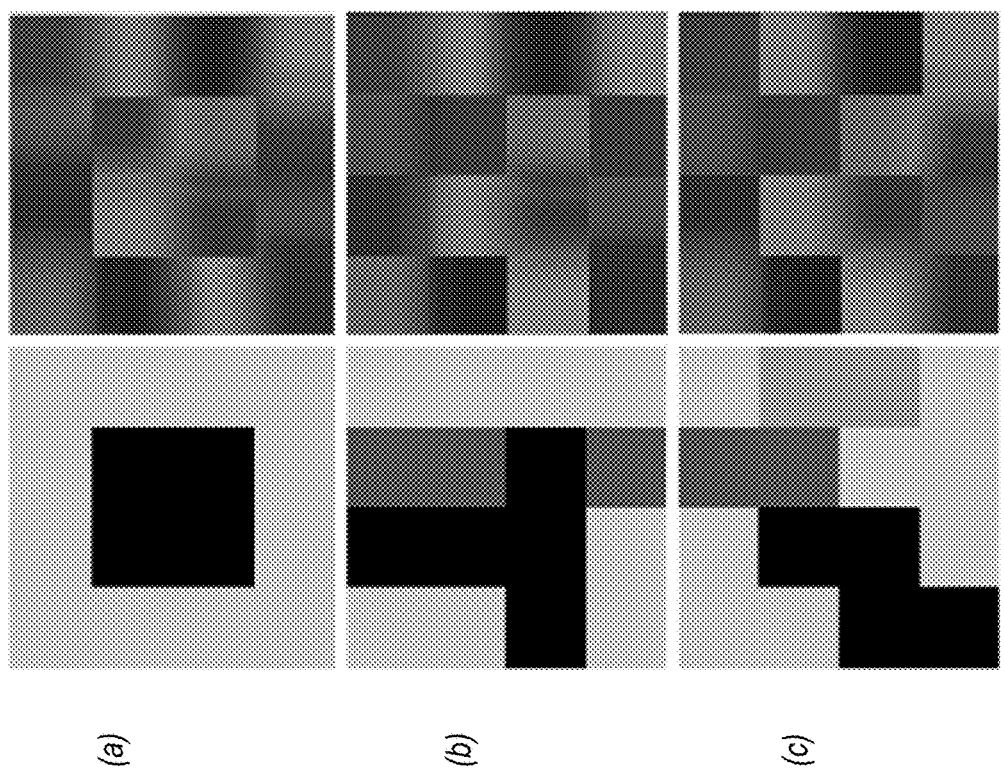
FIG. 6 is a diagram illustrating exemplary texel smoothing groups, according to some embodiments.

FIG. 6 illustrates three examples (a), (b), and (c) of different texel smoothing groups (left) and exemplary uses of these groups in texture sampling (right). As used herein, a "texel smoothing group" refers to a group of texels between which a particular type of interpolation is used while another type of interpolation is used between texels from different smoothing groups. In some embodiments, one of the types of interpolation is adaptive interpolation which the other type is a linear type of interpolation (e.g., linear, bilinear, etc.). In other embodiments, any of various different types of interpolation may be used to distinguish the edges defined by the left column of FIG. 6.

In example (a), a 4×4 texture includes two texel groups (an inner group of four texels shown using black and an outer group of 12 texels shown using gray). In the illustrated example, TPU 165 uses adaptive interpolation between texels in different texel smoothing groups while using linear interpolation between texels in the same texel smoothing group. Thus, as shown on the right for example (a), the inner group of pixels is smoothed while a sharper delineation (using a relatively small adaptive interpolation width) is maintained between the two pixel smoothing groups.

Examples (b) and (c) show additional examples of smoothing groups, generated using similar techniques to those described above with reference to example (a). On the left, pixels having the same shade belong to the same pixel group, and the resulting interpolation is shown on the right for each example.

In some embodiments, TPU 165 is configured to receive texel smoothing group information via an alpha channel for a given texel. In these embodiments, when the alpha channel for adjacent texel has a different value those texels are belong to different texel smoothing groups. In other embodiments, texel smoothing group information may be specified by a secondary texture and/or graphics program using other methods.

Figure 7A:
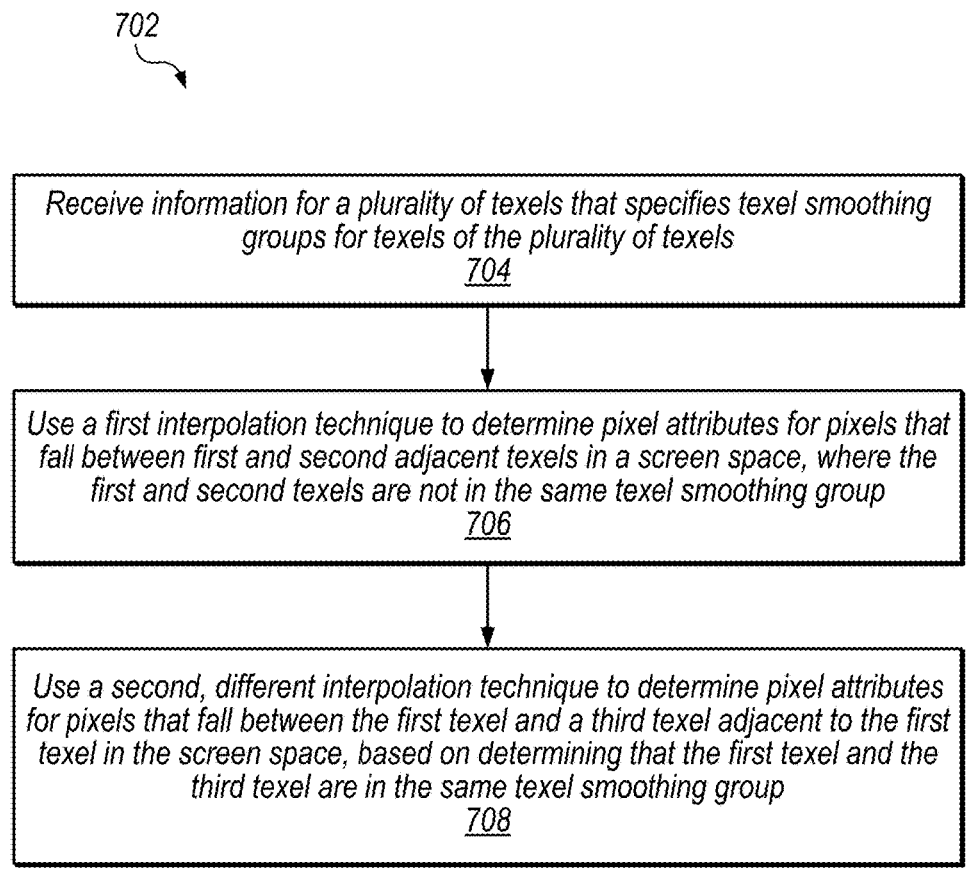
FIG. 7A is a flow diagram illustrating one embodiment of a method for using texel smoothing groups.

Referring now to FIG. 7A, a flow diagram illustrating an exemplary method 702 for using texel smoothing groups is shown, according to some embodiments. The method shown in FIG. 7A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Method 702 begins at 704.

At 704, information is received for a plurality of texels. In this embodiment, the information specifies texel smoothing groups for texels of the plurality of texels. Flow proceeds to 706.

At 706, a first interpolation technique is used to determine pixel attributes for pixels that fall between first and second adjacent texels in a screen space, where the first and second texels are not in the same texel smoothing group. Flow proceeds to 708.

At 708, a second interpolation technique is used to determine pixel attributes for pixels that fall between the first texel and a third texel adjacent to the first texel in the screen space, based on determining that the first texel and the third texel are in the same texel smoothing group. Method 702 ends at 708.

In some embodiments, the first interpolation technique of 706 is adaptive interpolation and the second interpolation technique of 708 is not adaptive interpolation. In some embodiments, the second interpolation technique is at least one of: linear, quadratic, cubic, polynomial, or transcendental. In some embodiments, the information is specified using an alpha channel. In some embodiments, the information is included in a texture. In some embodiments, the information is specified by a graphics program. In some embodiments, the texture data and coordinate space of the texture data is multi-dimensional.

In some embodiments, graphics unit 150 includes circuitry such as TPU 165 that is configured to perform method 702, e.g., based on texel smoothing group information from a texture and/or a graphics program.

Exemplary Method

Figure 7B:
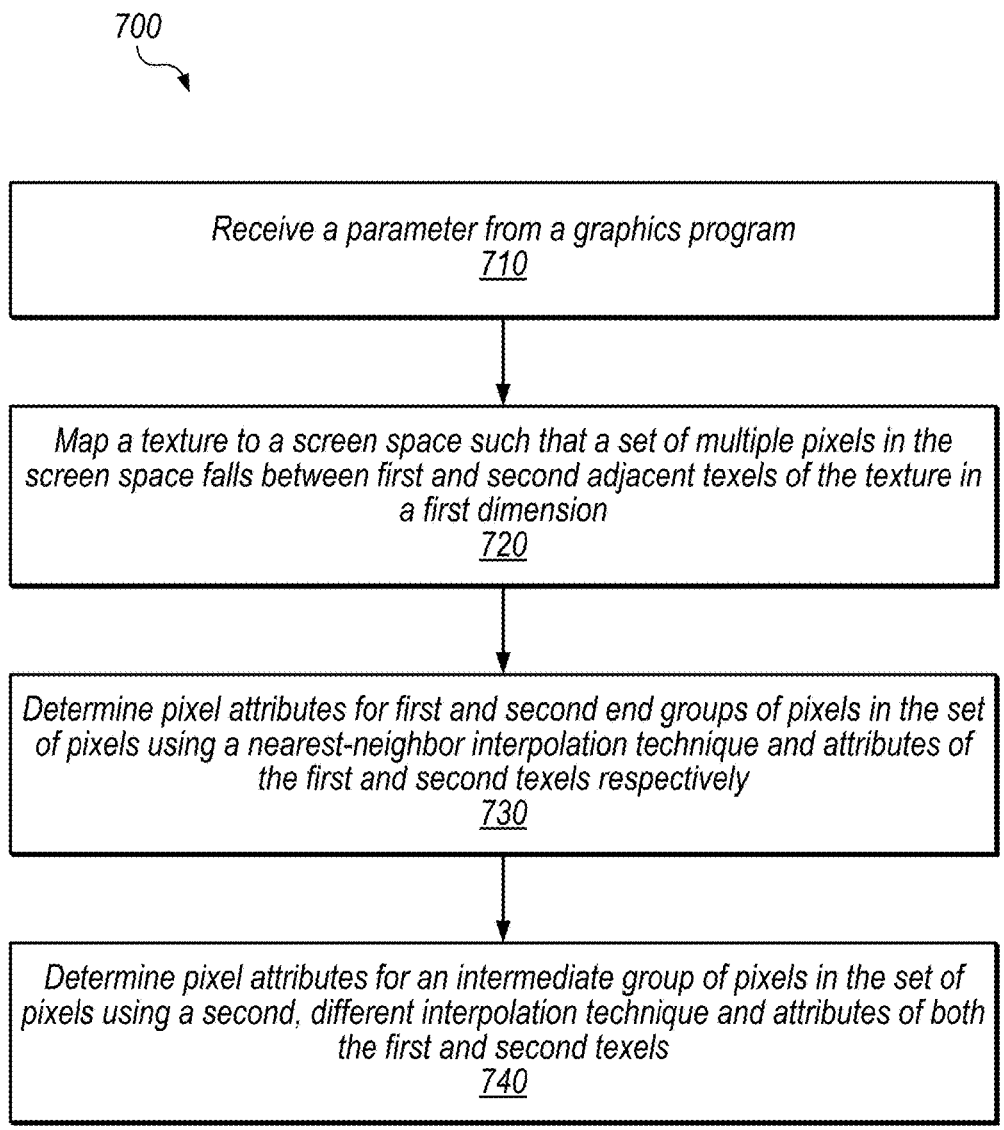
FIG. 7B is a flow diagram illustrating one embodiment of a method for performing adaptive interpolation.

Referring now to FIG. 7B, a flow diagram illustrating an exemplary method 700 for performing adaptive interpolation is shown, according to some embodiments. The method shown in FIG. 7B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Method 700 begins at 710.

At 710, in the illustrated embodiment, a graphics unit (e.g., graphics unit 150 and/or USC 160) receives a parameter from a graphics program. The parameter may specify that adaptive interpolation should be performed for a given sample or a given texture. The parameter may specify an interpolation width for adaptive interpolation (e.g., in units of screen-space pixels or using some other unit). Flow proceeds to 720.

At 720, in the illustrated embodiment, USC 160 maps a texture to a screen space such that a set of pixels that includes multiple pixels in the screen space falls between first and second adjacent texels of the texture in a first dimension. For example, USC 160 may magnify the texture. Flow proceeds to 730.

At 730, TPU 165 determines pixel attributes for first and second end groups of pixels in the set of pixels using a nearest-neighbor interpolation technique and attributes of the first and second texels respectively. Said another way, for pixels in one of the end groups, pixel attributes are assigned based on one of the first or second texels, but not both. The first and second end groups may be included in a set that includes additional end groups, e.g., when interpolation is performed in multiple dimensions, as described above with reference to FIG. 5 (in that example, pixels between texels A, B, C, and D may be divided into four end groups and an intermediate group roughly corresponding to the cross shape delineated by the dashed lines). Flow proceeds to 740.

At 740, TPU 165 determines pixel attributes for an intermediate group of pixels in the set of pixels using a second, different interpolation technique and attributes of both the first and second texels. Said another way, for pixels in the intermediate group, pixel attributes are assigned based on attributes of both of the first and second texels (and perhaps additional texels, depending on the interpolation technique). This second interpolation technique may smooth unwanted visual artifacts while the nearest-neighbor interpolation technique may maintain a desired pixelated effect. Method 700 ends at 740.

Exemplary Device

Figure 8:
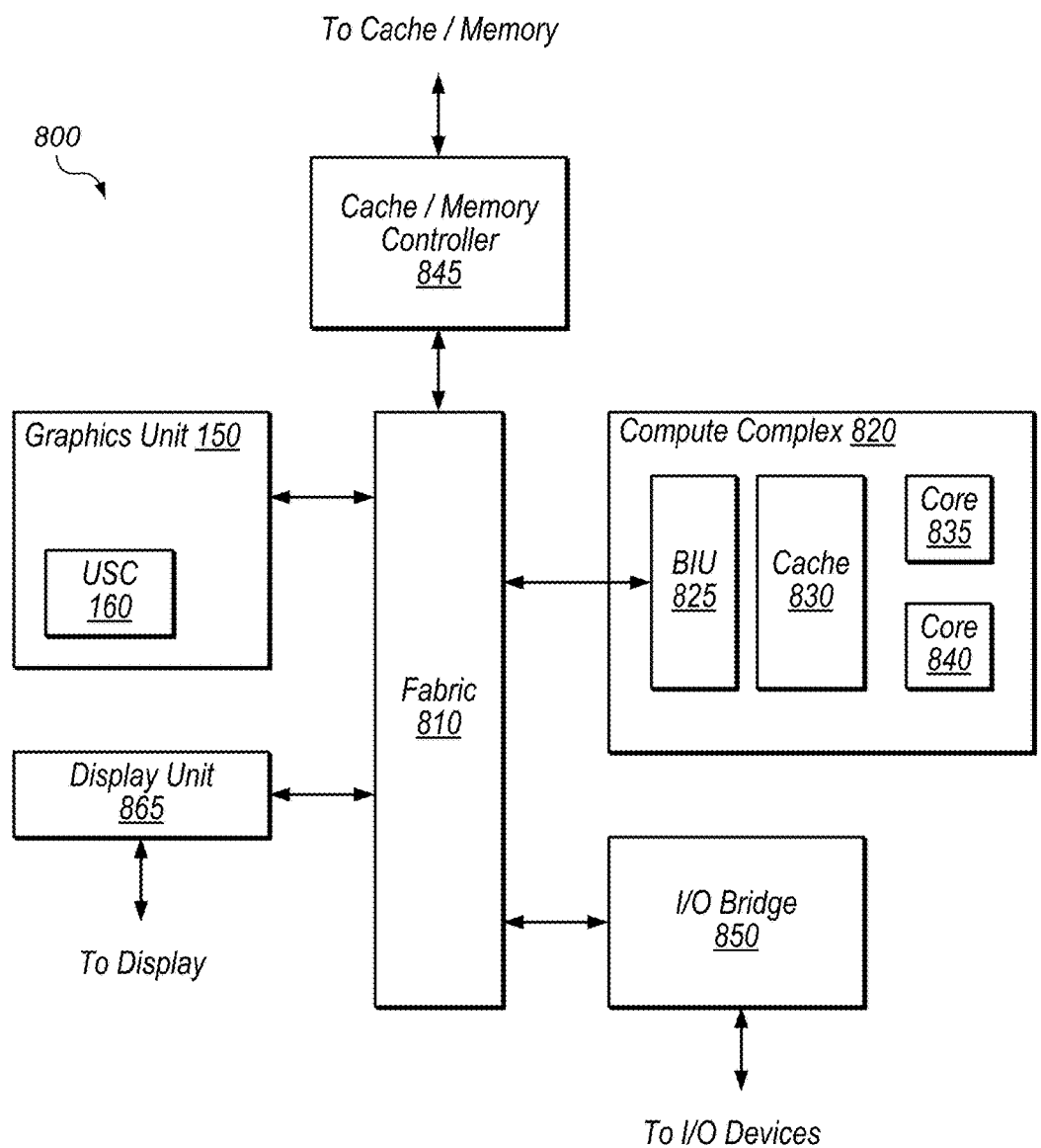
FIG. 8 is a block diagram illustrating one embodiment of a device that includes one or more processors.

Referring now to FIG. 8, a block diagram illustrating an exemplary embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820, input/output (I/O) bridge 850, cache/memory controller 845, graphics unit 850, and display unit 865.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. Compute complex 820 may correspond to processor 100 in some embodiments. In various embodiments, compute complex 820 may include various numbers of processors, processor cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 850 may be described as "coupled to" a memory through fabric 810 and cache/memory controller 845. In contrast, in the illustrated embodiment of FIG. 8, graphics unit 850 is "directly coupled" to fabric 810 because there are no intervening elements.

Graphics unit 850 may include one or more processors and/or one or more graphics processing units (GPU's). Graphics unit 850 may receive graphics-oriented instructions, such as OPENGL®, Metal, or DIRECT3D® instructions, for example. Graphics unit 850 may execute specialized GPU instructions or perform other operations based on the received graphics-oriented instructions. Graphics unit 850 may generally be configured to process large blocks of data in parallel and may build images in a frame buffer for output to a display. Graphics unit 850 may include transform, lighting, triangle, and/or rendering engines in one or more graphics processing pipelines. Graphics unit 850 may output pixel information for display images.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A graphics unit, comprising:
    circuitry configured to map a texture to a screen space such that a set of multiple pixels in the screen space falls between first and second adjacent texels of the texture in a first dimension; and
    texture processing circuitry configured to perform different types of interpolation for pixels in the set of pixels, including:
        using a nearest-neighbor interpolation technique and attributes of the first and second texels respectively to determine pixel attributes for first and second end groups of pixels in the set of pixels; and
        using a second, different interpolation technique and attributes of both the first and second texels to determine pixel attributes for an intermediate group of pixels in the set of pixels;
    wherein the texture processing circuitry is configured to perform the different types of interpolation based on a parameter that specifies a size for the intermediate group of pixels.

2. The graphics unit of claim 1, wherein mapping of the texture to the screen space includes magnification of the texture.

3. The graphics unit of claim 1, wherein the second interpolation technique is a linear interpolation technique.

4. A method, comprising:
    receiving, by a graphics unit that includes texture processing circuitry, a parameter from a graphics program;
    mapping, by the graphics unit, a texture to a screen space such that a set of multiple pixels in the screen space falls between first and second adjacent texels of the texture in a first dimension;
    the texture processing circuitry performing, based on receiving the parameter:
        determining pixel attributes for first and second end groups of pixels in the set of pixels using a nearest-neighbor interpolation technique and attributes of the first and second texels respectively; and
        determining pixel attributes for an intermediate group of pixels in the set of pixels using a second, different interpolation technique and attributes of both the first and second texels;
        wherein a size of the intermediate group of pixels is determined based on the parameter.

5. The method of claim 4, wherein the parameter specifies a number of pixels for the size in the screen space.

6. The method of claim 4, wherein determining pixel attributes for the intermediate group using the second interpolation technique is based on attributes of one or more other texels in addition to attributes of the first and second texels.

7. The method of claim 4, wherein the second interpolation technique is at least one of: linear, quadratic, cubic, polynomial, or transcendental.

8. A non-transitory computer-readable medium having instructions stored thereon that are executable by a computing device to perform operations comprising:
    determining an adaptive interpolation parameter;
    mapping a texture to a screen space such that a set of multiple pixels in the screen space falls between first and second adjacent texels of the texture in a first dimension;
    determining, based on the adaptive interpolation parameter, pixel attributes for first and second end groups of pixels in the set of pixels using a nearest-neighbor interpolation technique and attributes of the first and second texels respectively; and
    determining, based on the adaptive interpolation parameter, pixel attributes for an intermediate group of pixels in the set of pixels using a second, different interpolation technique and attributes of both the first and second texels;
    wherein the adaptive interpolation parameter indicates a number of pixels in the intermediate group of pixels.

9. The non-transitory computer-readable medium of claim 8, wherein the adaptive interpolation parameter is included in one or more sample instructions.

10. The non-transitory computer-readable medium of claim 8, wherein the adaptive interpolation parameter is included in texture state information for the texture.

11. The non-transitory computer-readable medium of claim 8, wherein the determining pixel attributes for the first and second end groups of pixels and the intermediate group of pixels is performed for a first type of pixel attribute and not for a second type of pixel attribute based on the parameter.

12. The non-transitory computer-readable medium of claim 11, wherein the first type of pixel attribute corresponds to a first channel and the second type of pixel attribute corresponds to a second channel.

13. An apparatus, comprising:
  circuitry configured to map a texture to a screen space such that a set of multiple pixels in the screen space falls between first and second adjacent texels of the texture in a first dimension; and
  texture processing circuitry configured to perform different types of interpolation for pixels in the set of pixels, including:
    receiving texel smoothing group information that identifies the first and second texels as belonging to different texel smoothing groups;
    using a nearest-neighbor interpolation technique and attributes of the first and second texels respectively to determine pixel attributes for first and second end groups of pixels in the set of pixels; and
    using a second, different interpolation technique and attributes of both the first and second texels to determine pixel attributes for an intermediate group of pixels in the set of pixels;
    wherein the determination of the pixel attributes for the end groups of pixels and the intermediate group of pixels is based on the texel smoothing group information.

14. The apparatus of claim 13, wherein the texel smoothing group for each texel is specified using an alpha channel.

15. The apparatus of claim 13, wherein the texture processing circuitry is further configured to perform a single type of interpolation for a second set of pixels that fall between the first texel and a third texel in the mapping of the texture to the screen space, based on a determination that the first and third texels are in the same texel smoothing group.

16. A non-transitory computer-readable medium having instructions stored thereon that are executable by a computing device to perform operations comprising:
  determining an adaptive interpolation parameter;
  mapping a texture to a screen space such that a set of multiple pixels in the screen space falls between first and second adjacent texels of the texture in a first dimension; and
  based on determining that the first and second texels are in different texel smoothing groups:
    determining, based on the adaptive interpolation parameter, pixel attributes for first and second end groups of pixels in the set of pixels using a nearest-neighbor interpolation technique and attributes of the first and second texels respectively; and
    determining, based on the adaptive interpolation parameter, pixel attributes for an intermediate group of pixels in the set of pixels using a second, different interpolation technique and attributes of both the first and second texels.

17. The non-transitory computer-readable medium of claim 16, wherein the operations further comprise:
  performing a single type of interpolation for a second set of pixels that fall between the first texel and a third texel in the mapping of the texture to the screen space, based on a determination that the first and third texels are in the same texel smoothing group.

18. The non-transitory computer-readable medium of claim 16, wherein the texel smoothing group for each texel is specified using an alpha channel.

* * * * *